United States Patent Office 3,140,977
Patented July 14, 1964

3,140,977
FUNGICIDAL COMPOSITIONS CONTAINING TRIPHENYL COMPOUNDS
Werner Duyfjes and Willem de Lange, Amsterdam, Netherlands, assignors to North American Philips Company, Inc., New York, N.Y., a corporation of Delaware
No Drawing. Filed May 15, 1961, Ser. No. 109,805
Claims priority, application Netherlands May 27, 1960
13 Claims. (Cl. 167—30)

It is known that organic compounds of tetravalent tin have fungitoxic activity. As such, triphenyl tin compounds, for example triphenyl tin chloride, acetate and hydroxide have been described. However, these compounds are phytotoxic to a greater or lesser extent. Hence, they are not simply suitable for combating moulds on living plants in practice; it has for example, been described that a composition containing triphenyl tin acetate is too phytotoxic to be applied to fruit trees, tomatoes, hop and vines.

It is also known that of the three above-mentioned triphenyl tin compounds the hydroxide is less phytotoxic than the acetate, which is again less phytotoxic than the chloride.

It has also been described that the pH frequently effects the biocidal properties of organic molecules, and that the fungitoxic activity of triethyl tin hydroxide is slightly increased if the pH of the culture medium for the moulds to be treated with this substance increases from 4.2 to 6.9.

It has now been found that a composition containing a triphenyl tin compound as the active ingredient, whilst retaining a strong fungitoxic activity, has a surprisingly low phytotoxic activity if the composition is made up so that the pH of a suspension in water containing 0.3% by weight of the active ingredient exceeds 7 and especially lies between 8 and 12.

Compositions have been produced and tested containing triphenyl tin chloride (A) and triphenyl tin acetate (B) respectively as the active ingredient and, in addition an inert carrier and a non-ionogenic emulsifying agent, and also compositions to which furthermore was added an amount of sodium carbonate such that a suspension in water containing 0.3% by weight of the active ingredient had a pH of about 7.8 (A1 and B1); furthermore, compositions were produced containing an amount of sodium carbonate such that the said suspension had a pH of about 9.8 (A2 and B2), and compositions containing an amount of sodium carbonate such that the said pH had a value of 10.4 (A3 and B3). Of these various compositions, suspensions were made containing 0.3% by weight of the active ingredients, and young plants of dwarf French bean, tomato and cucumber were sprayed with these suspensions. Ten days after spraying, the resulting damage (leaf burning) was determined. It was found that the composition A has caused intense leaf burning and the composition B considerable leaf burning; in the plants treated with A1 and B1 this was materially less, whilst the compositions A2, B2, A3 and B3 had done substantially no damage.

Presumably, the triphenyl tin chloride and triphenyl tin acetate in the basic aqueous suspensions with which the plants were sprayed, are converted into the triphenyl tin hydroxide which is less phytotoxic. However, the observed reduction of the phytotoxic activity cannot be entirely due to the formation of triphenyl tin hydroxide, for it has been found that replacement of triphenyl tin chloride or triphenyl tin acetate by triphenyl tin hydroxide as the active ingredient does not result in the reduction in phytotoxicity obtained by adding sodium carbonate to the above-mentioned compositions.

In this connection, another remarkable result obtained should be pointed out. A composition which contains triphenyl tin hydroxide as the active ingredient and to which is added an amount of a basic substance, for example of sodium carbonate, such that a suspension of the composition in water containing 0.3% by weight of triphenyl tin hydroxide has a pH between 7 and 12, has a materially weaker phytotoxic activity than a composition which contains triphenyl tin hydroxide as the active ingredient but to which no basic substance is added. A suspension of 0.3% by weight of triphenyl tin hydroxide in water has a pH of 6.5.

By the addition of the basic substance, the fungitoxic activity of the compositions is not decreased and in some cases even increased.

The invention relates to compositions for combating moulds on living plants and to the production and use of these compositions, which contain as the active ingredient a triphenyl tin compound of the formula $[(C_6H_5)_3Sn]_n$—X, where $n=1$ or 2, and X denotes an inorganic or organic acid radical and may be the group OH, if $n=1$, or oxygen, if $n=2$, and the invention is characterized in that said compositions contain an amount of a basic substance such that a suspension in water containing 0.3% by weight of the active ingredient has a pH exceeding 7 and preferably lying between 8 and 12.

Suitable triphenyl tin compounds are, for example, triphenyl tin chloride, bromide, hydroxide, sulphate, borate, acetate, propionate, benzoate, oxide, sulphide, disulphide, oxalate, succinate, phthalate, p-toluene sulphonate and bis(triphenyl tin) ethylene bis-dithio-carbamate.

Considered from a technical and economical point of view, of these triphenyl tin compounds the triphenyl tin chloride is the most attractive compound for practical use. However, the high phytotoxic activity of this substance hampered the practical use in compositions for combating moulds on living plants. It is a particular advantage of the present invention that it renders this use possible.

A large number of water soluble basic compounds have been tested and found suitable. Suitable substances are, for example, sodium carbonate, sodium bicarbonate, potassium carbonate, potassium bicarbonate, borax, calcium hydroxide, barium hydroxide, sodium hydroxide, potassium hydroxide, ammonium hydroxide, aniline, morpholine, hexamethylene tetramine and triethanol amine. Particularly suitable are carbonates and bicarbonates of sodium and potassium and furthermore salts and mixtures of salts showing buffer action, such as borax, a mixture of borax and boric acid and a mixture of sodium carbonate and sodium bicarbonate.

The nature of the basic substance to be used is related to a certain extent to the nature of the compositions. Thus, the said carbonates and borax may be used to advantage in dusts and wettable powders. In liquid concentrates containing organic solvents, for example ketones, alcohols or glycols, an organic base, for example triethanolamine or aniline, may be used. In cases where the fungicide is applied to the plants to be treated in the form of an aqueous suspension or emulsion, the basic substance may be added to the water used for producing said suspension or emulsion. In these cases, caustic soda, caustic potash or ammonium hydroxide may be used.

The amount of the basic substance to be used depends on the nature of the triphenyl tin compound and also upon the nature of the basic substance itself. Thus, when triphenyl tin hydroxide and bis(triphenyl tin) oxide are used, a smaller amount of basic substance will suffice than in the case of triphenyl tin chloride. If a substance having buffer action, for example borax, is used, owing to this buffer action dosage may be less accurate and a larger excess may be used than, for example, of a solution of caustic soda.

Hence, the amount of basic substance may vary up to about 7 gram-equivalents per gram-equivalent of active ingredient, if triphenyl tin hydroxide or bis(triphenyl tin) oxide is used, preferably from 0.4 to 3 and in particular from 1 to 8 gram-equivalents of basic substance and, if a triphenyl tin compound of the above-mentioned formula is used, where X denotes an acid radical, from 1.2 to 4 and in particular from 2 to 3 gram-equivalents of basic substance are used per gram-equivalent of triphenyl tin compound.

In compositions not intended for immediate application, non-hygroscopic basic substances will be preferably used. For dusts, wettable powders and seed disinfectants, solid substances are particularly suitable; for liquid concentrates, substances are suitable which are soluble in organic solvents.

It has also been found that the phytotoxic activity of the above-described compositions can be further reduced by incorporation a hydrophilic, organic substance capable of producing a colloidal solution in water.

It has been found that use may be made of, for example, gelatine, albumin, lactalbumin, glutenin, casein, ureacaseinate, starch, gum arabic, pectin, sodium pactinate, agar-agar, alginate, tragacanth, carboxymethyl, cellulose, polyvinyl alcohol, polyvinyl pyrrolidone and polyethylene glycol. As is well known these compounds are all colloids. Preferably substances are used which in cold water, for example water of about 15° C. are capable of producing a colloidal solution, for example partially hydrolysed gelatine, cold-water-starch and carboxymethyl cellulose.

Especially in compositions containing triphenyl tin chloride as the fungicide, a material reduction of the phytotoxic activity was found.

The amount of hydrophilic, organic substance to be used in a composition is from 10 to 100% by weight and preferably from 30 to 60% by weight of the amount of triphenyl tin compound contained in the composition.

Compositions having a materially reduced phytotoxic activity were obtained by the use of a hydrophilic organic substance of the above-described kind in wettable powders and in particular by the use of partially hydrolysed gelatine capable of producing a colloidal solution in cold water. The said hydrophilic, organic substances may also be used in dusts and seed disinfectants. They may be used in miscible oils (liquid concentrates dispersible in water) by dissolving the hydrophilic organic substance in the water in which the miscible oil is dispersed before it is applied to the plant.

Examples of compositions according to the invention are:

(a) Dusts containing from 0.2 to 10% by weight of active ingredient and from 0.1 to 5% by weight of borax, sodium carbonate, sodium bicarbonate, a mixture of borax and boric acid (1:1), a mixture of sodium carbonate and sodium bicarbonate (1:1) or calcium hydroxide and, for example, 3% by weight of triphenyl tin acetate and 1.5% by weight of a mixture of sodium carbonate and sodium bicarbonate (1:1).

(b) Wettable powders containing from 15 to 60% by weight of active ingredient and from 4 to 30% by weight of borax, sodium carbonate, sodium bicarbonate, a mixture of borax and boric acid (1:1), a mixture of sodium carbonate and sodium bicarbonate (1:1) or calcium hydroxide and, for example, 20% by weight of triphenyl tin chloride, 10% by weight of sodium carbonate and 35% by weight of china clay, 30% by weight of Al-silicate and 5% by weight of dispersing and wetting agents.

(c) Liquid concentrates containing from 5 to 30% by weight of active ingredient and from 1:5 to 15% by weight of basic substance and furthermore solvents and adjuvants and, for example, 20% by weight of bis(triphenyl tin) sulfide, 15% by weight of triethanol amine, 5% by weight of non-ionogenic emulsifying agent and 60% by weight of a solvent soluble in water, for example acetone, dimethyl formamide, methanol or glycol.

(d) Seed disinfectants containing from 0.5 to 10% by weight of active ingredient and from 0.2 to 5% by weight of borax, sodium carbonate, sodium bicarbonate, a mixture of borax and boric acid (1:1), a mixture of sodium carbonate and sodium bicarbonate (1:1) or calcium hydroxide and, for example, 5% by weight of triphenyl tin hydroxide, 2.5% by weight of borax, 92% by weight of china clay and a slight amount of an adhesive.

(e) Compositions according to a, b or d containing any of the above-mentioned hydrophilic, organic substances in an amount corresponding to from 30 to 60% by weight of the amount of triphenyl tin compound used.

The compositions may further be made according to known methods by mixing, grinding, etc., with the use of known carriers and adjuvants, such as surface-active substances, dispersing agents and/or adhesives. The solid compositions are preferably pulverized to a mean particle size of about $10\mu$ or less.

What is claimed is:

1. A composition for combatting fungi on living plants, containing as the active ingredient a triphenyl tin compound of the formula $[(C_6H_5)_3Sn]_n$—X, wherein $n$ is a whole integer from 1 to 2, X is an anionic moiety selected from the group consisting of chloride, bromide, sulfate, borate, acetate, propionate, benzoate, sulfide, disulfide, oxalate, succinate, phthalate, paratoluene sulfonate and ethylene bis-dithiocarbamate, hydroxyl when $n=1$ and oxygen when $n=2$, at least one water soluble basic compound and an organic hydrophilic colloid, the concentration of said basic compound being such that a suspension in water of said composition containing 0.3% by weight of the active ingredient has a pH between 8 and 12.

2. The composition of claim 1, wherein the basic compound is selected from the group consisting of sodium carbonate, sodium bicarbonate, potassium carbonate, potassium bicarbonate and calcium hydroxide.

3. The composition of claim 1, wherein a mixture of sodium carbonate and sodium bicarbonate is used as the basic compound.

4. The composition of claim 1, wherein the hydrophilic organic colloid is present in an amount of from 10 to 100% by weight of the triphenyl tin compound used.

5. The composition of claim 1 wherein the hydrophilic, organic colloid is selected from the group consisting of partially hydrolyzed gelatine, cold-water starch and carboxymethyl cellulose.

6. The composition of claim 1 wherein from 0.4 to 3 gram-equivalent of the basic compound is present per gram equivalent of the tin compound and X is hydroxyl.

7. The composition of claim 1 wherein from 0.4 to 3 gram-equivalent of the basic compound is present per gram equivalent of the tin compound and X is oxygen.

8. The composition of claim 1 wherein X is acetate and from 1.2 to 4 gram-equivalent of the basic compound is present per gram-eqiuvalent of the tin compound.

9. The composition of claim 1 wherein the basic compound is borax.

10. The composition of claim 1 wherein a mixture of borax and boric acid is used as the basic compound.

11. A method of combatting fungi on living plants comprising contacting said plants with a composition for combatting fungi on living plants, containing as the active ingredient a triphenyl tin compound of the formula $[C_6H_5)_3Sn]_n$—X, wherein $n$ is a whole integer from 1 to 2, X is an anionic moiety selected from the group consisting of chloride, bromide, sulfate, borate, acetate, propionate, benzoate, sulfide, disulfide, oxalate, succinate, phthalate, paratoluene sulfonate and ethylene bis-dithiocarbamate, OH when $n=1$, and oxygen when $n=2$, at least one water soluble basic compound and a hydrophilic organic colloid, the concentration of said basic compound being such that a suspension in water of said composition containing 0.3% of the active ingredient has a pH between 8 and 12.

12. A composition for combatting fungi on living plants comprising a fungicidally effective amount of triphenyl tin hydroxide, sodium carbonate, casein, a wetting agent, and an inert solid carrier therefor, the concentration of the sodium carbonate being such that a suspension in water of said composition in which 0.3% of the triphenyl tin hydroxide is present has a pH of between 8 and 12.

13. A method of combatting fungi on living plants comprising contacting said plants with a composition for combatting fungi on living plants comprising a fungicidally effective amount of triphenyl tin hydroxide, sodium carbonate, casein, a wetting agent, and an inert solid carrier therefor, the concentration of the sodium carbonate being such that a suspension in water of said composition in which 0.3% of the triphenyl tin hydroxide is present has a pH of between 8 and 12.

References Cited in the file of this patent

UNITED STATES PATENTS

| | | |
|---|---|---|
| 2,614,061 | Coash | Oct. 14, 1952 |
| 2,721,861 | Paterson | Oct. 25, 1955 |
| 2,774,710 | Thompson et al. | Dec. 18, 1956 |
| 2,836,540 | Hardt | May 27, 1958 |
| 2,868,820 | Nitzsche et al. | Jan. 13, 1959 |
| 2,876,160 | Scloch et al. | Mar. 3, 1959 |
| 2,922,738 | McDermott et al. | Jan. 26, 1960 |
| 3,028,308 | Zambito et al. | Apr. 3, 1962 |
| 3,031,483 | Koopmans | Apr. 24, 1962 |
| 3,062,708 | Updegraff | Nov. 6, 1962 |

OTHER REFERENCES

Biochimica et Biophysica Acta, vol. 6 (1950), pp. 232–233, J.A. Chem., June 4, 1954, pp. 314–319.